US006888997B2

(12) United States Patent
Duong

(10) Patent No.: US 6,888,997 B2
(45) Date of Patent: May 3, 2005

(54) WAVEGUIDE DEVICE AND OPTICAL TRANSFER SYSTEM FOR DIRECTING LIGHT TO AN IMAGE PLANE

(75) Inventor: Dung T. Duong, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/660,214

(22) Filed: Sep. 11, 2003

(65) Prior Publication Data

US 2004/0047585 A1 Mar. 11, 2004

Related U.S. Application Data

(62) Division of application No. 09/730,332, filed on Dec. 5, 2000, now Pat. No. 6,628,884.

(51) Int. Cl.⁷ .................................................. G02B 6/10
(52) U.S. Cl. ..................................................... 385/146
(58) Field of Search ............................... 385/146, 147, 385/29; 439/488; 333/113, 241; 126/677; 604/22

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |

(Continued)

FOREIGN PATENT DOCUMENTS

| | | | | |
|---|---|---|---|---|
| EP | 0 261 782 A2 | 8/1987 | ............ | H04N/1/46 |
| EP | 0 422 220 A1 | 3/1989 | ............ | A61B/6/03 |
| EP | 0 482 790 B1 | 9/1991 | ............ | H04N/1/40 |
| EP | 0 525 886 A3 | 7/1992 | ............ | G03D/5/00 |
| EP | 0 580 293 A1 | 6/1993 | ............ | H04N/1/04 |

(Continued)

OTHER PUBLICATIONS

"Adaptive Fourier Threshold Filtering: A Method to Reduce Noise and Incoherent Artifacts in High Resolution Cardiac Images", Doyle. M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson. D., et al., Research Reports, BioTechniques, vol. 25, No. 5, pp. 886–890, 1998.

(Continued)

Primary Examiner—Akm Enayet Ullah
(74) Attorney, Agent, or Firm—Dinsmore & Shohl

(57) ABSTRACT

A waveguide device including a light transmitting body having a first surface, a second surface, and a longitudinal axis where at least one of the first and second surfaces, and preferably both surfaces, are configured to extent in a direction non-parallel to the longitudinal axis. The body of the waveguide can be configured in an elliptical shape along the longitudinal axis, whereby a proximal portion of the waveguide device is symmetrical with a distal portion. The waveguide device being elliptically configured can be combined with a light to form an optical transfer system.

20 Claims, 3 Drawing Sheets

U.S. PATENT DOCUMENTS

| | | | |
|---|---|---|---|
| 3,615,498 A | 10/1971 | Aral | 96/55 |
| 3,617,109 A * | 11/1971 | Tien | 385/29 |
| 3,617,282 A | 11/1971 | Bard | 96/59 |
| 3,747,120 A | 7/1973 | Stemme | 346/75 |
| 3,790,905 A * | 2/1974 | Schuttloffel | 333/241 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,088,116 A * | 5/1978 | Pastor | 126/677 |
| 4,091,343 A * | 5/1978 | Knox et al. | 333/113 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,080,688 A * | 1/1992 | Cohen | 8/506 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,368,558 A * | 11/1994 | Nita | 604/22 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,758,001 A * | 5/1998 | Ionov | 385/122 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |
| 6,336,825 B1 * | 1/2002 | Seefried | 439/488 |

FOREIGN PATENT DOCUMENTS

| | | | | |
|---|---|---|---|---|
| EP | 0 580 293 A1 | 1/1994 | | H04N/1/04 |
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |

| | | | | |
|---|---|---|---|---|
| EP | 0 930 498 A2 | 12/1998 | ........... | G01N/21/88 |
| JP | 68732 | * 3/2000 | ................. | 385/146 |
| WO | WO 90/01240 | 2/1990 | ............ | H04N/1/40 |
| WO | WO 91/09493 | 6/1991 | ........... | H04N/5/217 |
| WO | WO 97/25652 | 7/1997 | ............ | G03D/5/00 |
| WO | WO 98/19216 | 5/1998 | ............ | G03C/5/29 |
| WO | WO 98/25399 | 6/1998 | ............ | H04N/1/38 |
| WO | WO 98/31142 | 7/1998 | ........... | H04N/5/253 |
| WO | WO 93/34157 | 8/1998 | | |
| WO | WO 98/34157 | 8/1998 | | |
| WO | WO 98/34397 | 8/1998 | | |
| WO | WO 99/43148 | 8/1999 | ............ | H04N/1/00 |
| WO | WO 99/43149 | 8/1999 | ........... | H04N/1/100 |
| WO | WO 01/01197 | 1/2001 | ............ | G03D/5/00 |
| WO | WO 01/13174 A1 | 2/2001 | ............ | G03D/5/06 |
| WO | WO 01/45042 A1 | 6/2001 | ............. | G06T/5/00 |
| WO | WO 01/50192 A1 | 7/2001 | ............ | G03C/7/407 |
| WO | WO 01/50193 A1 | 7/2001 | ............ | G03C/7/407 |
| WO | WO 01/50194 A1 | 7/2001 | ............ | G03C/7/407 |
| WO | WO 01/50197 A1 | 7/2001 | ............ | G03C/7/42 |
| WO | WO 01/52556 A2 | 7/2001 | ............ | H04N/9/11 |

OTHER PUBLICATIONS

"Low–Cost Display Assembly and Interconnect Using Ink––Jet Printing Technology", Hayes, D. et al., Display Works '99, MicroFab Technologies, Inc., pp. 1–4, 1999.

"Ink–Jet Based Fluid Microdispensing in Biochemical Applications". Wallace. D., MicroFab Technologies, Inc., Laboratory Automation News, vol. 1. No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

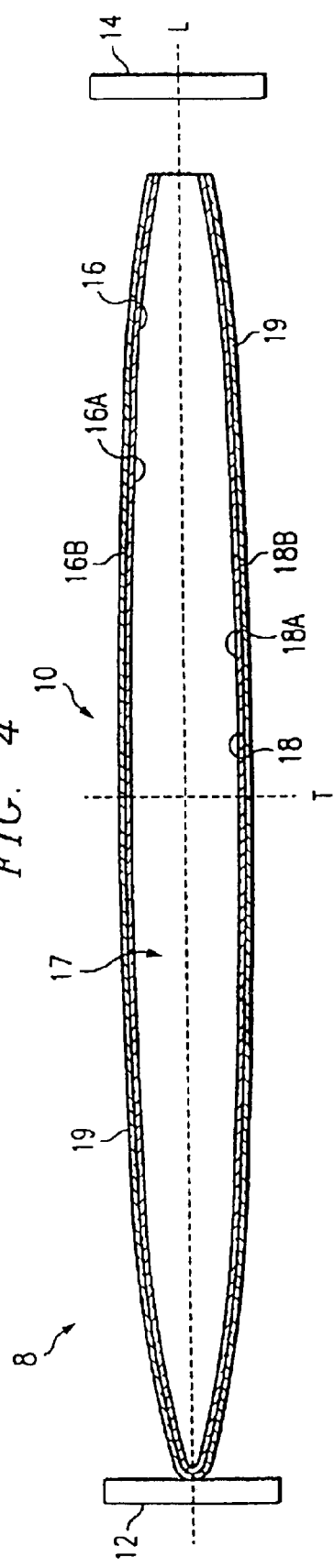
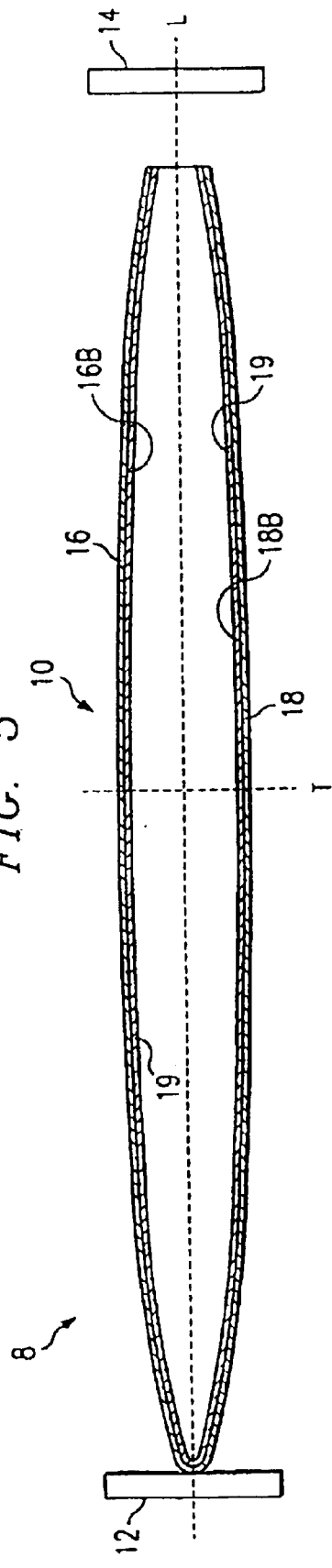

WAVEGUIDE DEVICE AND OPTICAL TRANSFER SYSTEM FOR DIRECTING LIGHT TO AN IMAGE PLANE

This is a Divisional application of U.S. application Ser. No. 09/730,332 filed Dec. 5, 2000 now U.S. Pat. No. 6,628,884.

TECHNICAL FIELD OF THE INVENTION

The present invention relates generally to light transfer devices and systems, and more particularly to a device used with a light transfer system for efficiently transferring light from a light source to an image plane.

BACKGROUND OF THE INVENTION

It is common practice to collect light and transmit light or electromagnetic energy from one location to another location in the form of rays or beams. In the past, light, which has been radiated in many directions, has been collected, and then relayed, focused or scanned by mirrors, lenses, and/or prisms. Optical light beams diverge and broaden, but they can be refocused by the use of lenses and mirrors. When using lenses, a typical condenser system (e.g., lens to collect light) projects the source of light onto an image plane. Since the light source is imaged, the light source should be generally uniform to enhance uniformity at the image plane being illuminated. However, there are several drawback and disadvantages to such imaging systems. For example, the collection angle in condenser systems is generally low compared to other systems. Also, the condenser systems generally have a plurality of optical elements, and as such, increases the complexity of mechanically mounting each component of the system, and can increase the overall cost of the system. Furthermore, the light beam can be easily obstructed or scattered by various objects.

Another conventional system is guided-wave optical devices. Conventional guided-wave optical devices transmit light through dielectric conduits, which can provide long distance light transmission without the need or use of relay lenses. Generally, a guided-wave optical device is a light conduit that is configured as either a slab, strip, or cylinder of dielectric material, and generally having a rectangular vertical cross sectional shape along its respective longitudinal axis. These guided-wave optic devices utilize internal reflections to integrate and transport light to an image plane. Light reflects off the interface between the dielectric material and outside material (e.g., a material with an index of refraction less than the dielectric material, such as glass with an additive, or air) interface.

In use, however, light exiting these guided-wave optical devices are not generally focused, and the level of irradiance of the image plane object can rapidly decrease as the distance between light source and the image plane increases. This can be due to a number of factors, including light being lost or leaking out of the guided-wave optical device due to refraction because of a lower than desired collection angle. Materials are generally softer and more difficult to machine. Furthermore, such materials can be more expensive and can be a more hazy material.

As can be seen, currently available optical devices and systems have a number of shortcomings that can greatly reduce the amount of light and/or focus of the light being transmitted from the light source to the image plane. Moreover, light being emitted from conventional devices and systems is not always uniform and any source imperfections are transmitted through the device and system.

SUMMARY OF THE INVENTION

Briefly summarized, the present invention comprises a waveguide device for transmitting light. In one embodiment of the present invention, the present invention comprises a waveguide device having a light transmitting body. The body includes a first surface and a second surface, and a longitudinal axis. At least one of the first and second surfaces, and preferably both surfaces, are configured to be non-parallel to the longitudinal axis. Furthermore, the first surface is configured to be non-parallel to the second surface. In a particular embodiment, the body of the waveguide device is configured in a generally elliptical shape along the longitudinal axis, whereby a proximal portion of the waveguide device is generally symmetrical with a distal portion.

To efficiently and effectively transmit light, the body of the waveguide device preferably comprises a dielectric material, such as either a plastic material (e.g., acrylic), or a glass material. In one embodiment, the body of the waveguide device is a solid piece of material. In another embodiment, the body may include a hollow chamber therein.

The first and/or second surfaces of the body may also include a reflective coating material. The coating may be bare gold, gold, aluminum, silver, mixtures thereof, or any other suitable reflective material.

The body of the waveguide of the present invention may also include an end surface that is configured to be parallel to the transverse axis of the waveguide device.

In another embodiment, the present invention comprises may include an optical transfer system having a light source operable to produce electromagnetic energy, and an elliptically configured waveguide device operable to receive electromagnetic energy from the light source. The waveguide device can direct the electromagnetic energy to an image plane. The waveguide device includes a body having a first surface and a second surface and a longitudinal axis, at least one of the first and second surfaces is configured to be non-parallel to the longitudinal axis. The waveguide device may also include an end portion provided adjacent the image plane, and/or an end that is positioned abutting the light source.

In yet another embodiment, the present invention may include a digital film processing system. The digital film processing system has at least one light source operable to produce light, and an elliptically configured waveguide device operable to direct light from at least one light source, such as a source of electromagnetic radiation, to a photographic media. The digital film processing system also includes at last one optical sensor operable to detect light from the photographic media and a computer processor connected to the at least one sensor and operable to produce a digital image. The at least one optical sensor operates to detect reflected and/or transmissive light from the photographic media.

BRIEF DESCRIPTION OF THE DRAWINGS

While the specification concludes with claims particularly pointing and distinctly claiming the present invention, it is believed the same will be better understood from the following description taken in conjunction with the accompanying drawings in which like numerals indicate the same elements throughout the views.

FIG. 4 is a vertical sectional view of yet another embodiment of an optical device and system in accordance with the present invention;

FIG. 5 is a vertical sectional view of still another embodiment of an optical device and system in accordance with the present invention.

DETAILED DESCRIPTION OF THE PREFERRED EMBODIMENTS

Figure 1:
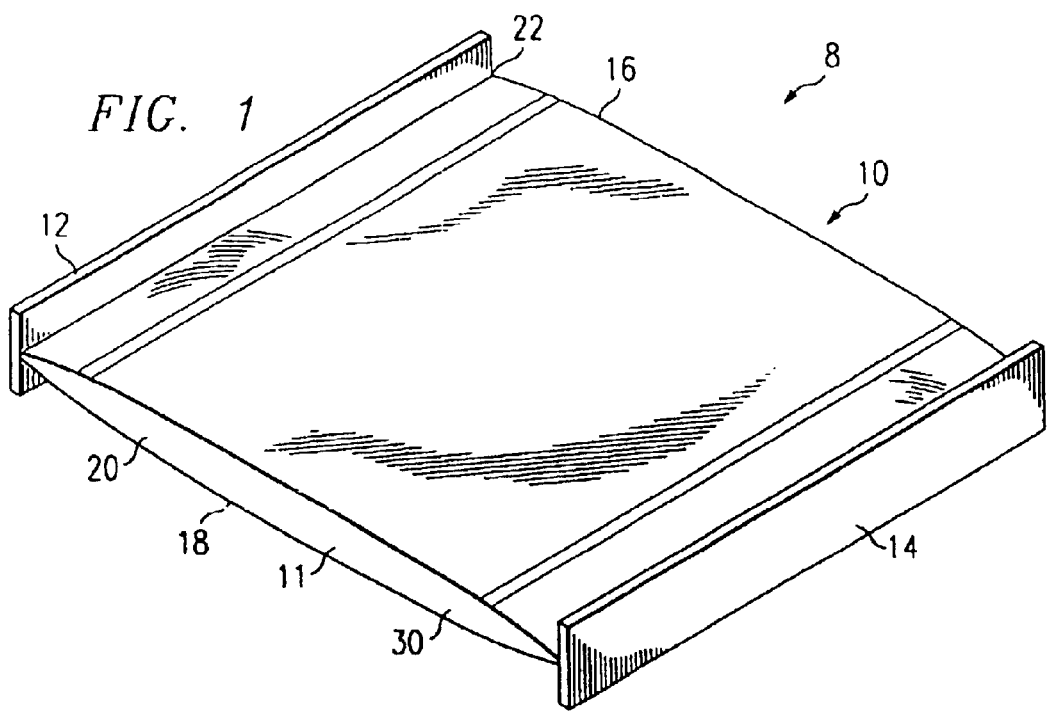
FIG. 1 is a prospective view of an optical device in accordance with the present invention.
Figure 2:
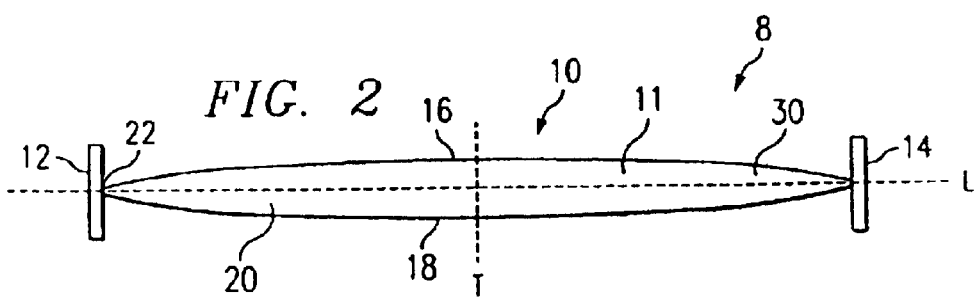
FIG. 2 is a vertical sectional view of an optical device and system in accordance with the present invention.

FIGS. 1 and 2 illustrate an optical transfer system 8 in accordance with one embodiment of the invention. In this embodiment of the present invention, the optical transfer system 8 comprises a light source 12 and a waveguide device 10. The light source 12 and waveguide device 10 of the optical transfer system 8 can be assembled using fixtures and techniques known in the industry. The present invention can be used in a variety of suitable articles and devices desiring the collection and transfer of light, such as a digital film processing system (see FIG. 6), a copier, a scanner, and various medical devices.

Light source 12 in the optical transfer system 8 is generally positioned relative to the waveguide device 10 so that the transfer or transmission of light to the waveguide device 10 is optimized. In one embodiment, the light source 12 is positioned adjacent one end 22 of the waveguide device 10, and preferably, in an abutting relationship with end 22, as exemplified in FIG. 2. Examples of light source 12 used with the present invention can include a source of electromagnetic radiation, a laser, an LED light array, fluorescent light tubes, or any other suitable light source.

Waveguide device 10 assists in the transfer or transmission of light over an extended distance and/or to hard to reach areas. In one embodiment, waveguide device 10 includes a generally longitudinally extending solid body 11 for transmitting light. The body 11 has a longitudinal axis L and a transverse axis T generally along the waveguide device's centerline, which is preferably generally perpendicular to the longitudinal axis L. In a preferred embodiment, the waveguide device 10 comprises a generally elliptical shaped vertical cross sectional configuration along its longitudinal axis L, as exemplified in FIGS. 2–5.

Waveguide device 10 includes a first surface 16, and a second surface 18, which generally define two outer boundaries of the waveguide device 10, and/or interfaces with the surrounding material, which can be air. First surface 16 and/or second surface 18 are preferably oriented in a non-parallel relationship to the longitudinal axis L, and\or to each other. The waveguide device 10 can have a generally overall elliptical cross sectional shaped configuration. The orientation of first surface 16 and a second surface 18, respectively, can be selected to enhance and/or maximize the collection angle of the waveguide device 10, preferably so that it can approach about 180 degrees relative to the longitudinal axis L, and maintain total internal reflection.

In an optical transfer system 8, proximal portion 20 of the waveguide device 10 is provided, generally adjacent the light source 12, and distal portion 30 of the waveguide device 10 is generally provided adjacent the image plane 14.

Body 11 of the waveguide device 10 can be made from any material that will transfer or transmit light. Illustrative examples of materials which are suitable for body 11 can include dielectric materials, glass and plastics, such as acrylics, polystyrenes, polycarbonates, and other dielectric materials that transmit light. Also, the material may also include additives to enhance the durability, the strength of the material, the optical quality, the heat resistance, and the flame retardants of the body 11. In one particular embodiment, the material of body 11 will be homogeneous to assist in reducing light scattering. In another embodiment, the material of body 11 is non-homogeneous and includes materials of varying densities to focus the light. The densities of non-homogeneous material of body 11 can vary in the form of a gradient that decreases in density, preferably linearly decreases, from the longitudinal axis L outwardly along the transverse axis T toward the first surface 16 and second surface 18. Body 11 also preferably will be resistant to scratching so that the waveguide device 10 is durable and wear resistant. Materials used for body 11 will have a suitable index of refraction to enhance light retention in the waveguide device 10, and to minimize the loss of light due to light refraction. Preferably, the index of refraction of body 11 is greater than or equal to about 1.4, more preferably from about 1.4 to about 1.6, and most preferably about 1.5.

As illustrated in FIG. 4, the body 11 may include a coating 19 to enhance wear resistance and durability, and/or to assist in preserving total internal reflection. Examples of coating 19 include materials and coating that are used with eyeglass lens, or contact lenses.

Turning back to FIGS. 1 to 3B, image plane 14 can be positioned so that light can be transmitted or transferred from waveguide device 10 to the image plane 14, and preferably, so that the irradiation of the light on the image plane 14 is enhanced. In one embodiment, the image plane 14 can be positioned or provided adjacent an oppositively disposed end 34 of the waveguide device 10. Image plane 14 can include various media and articles, including but not limited to, photographic media, paper, film, photodiodes, any media illuminator, and other medias and articles that will display a light image.

Figure 3A:
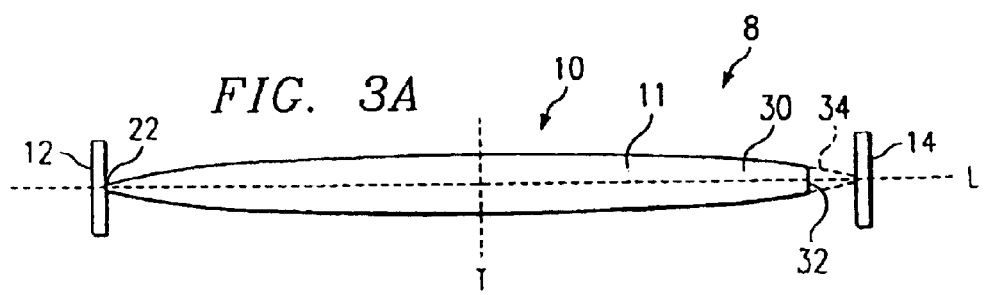
FIG. 3A is a vertical sectional view of alternative embodiment of an optical device and system in accordance with the present invention.
Figure 3B:
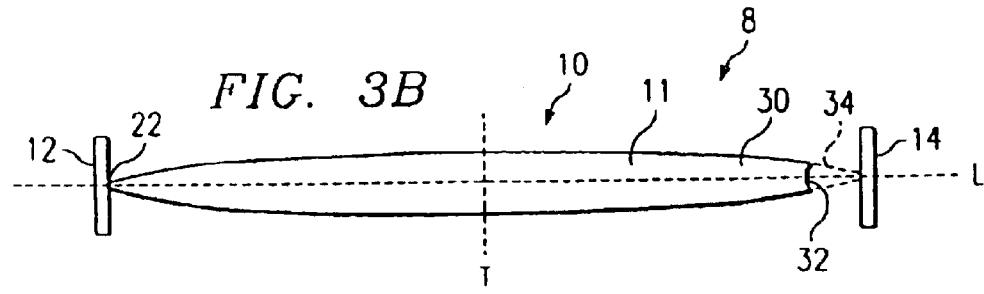
FIG. 3B is a vertical sectional view of yet alternative embodiment of an optical device and system in accordance with the present invention.

Turning now to FIG. 3A, distal portion 30 may include an end surface 32, which is generally configured to sharped the focus of the light on the image plane 14. The length between end surface 32 and image plane 14 operates to vary the focus point of the light being emitted from the waveguide device 10. The length between end surface 32 and image plane 14 can vary depending on whether it is desirable to reduce the loss of light, or to enhance the focus of the light on the image plane 14. As will be appreciated by those skilled in the art, the longer the length between end surface 32 and image plane 14, the further the focus point of the light is away from the image plane 14.

The end surface 32 may be configured in a parallel orientation relative to transverse axis T. In another embodiment, the end surface 32 may be configured in a hyperbolic or spherical surface, in an aspherical surface (e.g., see FIG. 3B), or in another shape to assist in compensating for the air/material interface refraction. In certain applications, the waveguide device 10 may be manufactured with end surface 32. Alternatively, an end portion 34 may be removed after manufacturing whereby the waveguide device 10 could be tailored to a particular need or situation.

In an alternative embodiment, exemplified in FIGS. 4 and 5, waveguide device 10 includes a hollow chamber 17 between the first surface 16 and the second surface 18 that is filled with material more transmissive, more homogeneous, and/or having a lower refractive index than body 11, such as air. Furthermore, coating 19, such as a reflective coating, may be used to assist in enhancing the focus point of the light on the image plane 14, and to minimizing or eliminate refraction of the light out of the waveguide device 10. The coating 19 may be applied to either the inner surface 16A of the first surface 16, and/or the inner surface 18A of the second surface 18 (See e.g., FIG. 4), or to the outer surfaces 16B and 18B of the first and second surfaces 16 and 18, respectively (See, e.g., FIG. 5), if, for example, the coating 19 is clear. Selection and placement of the coating 19 operates to optimize the transfer of light depending on the wavelength of light being transmitted through the waveguide device 10. For example, a coating 19 of a bare gold is preferred for use with near infrared light, whereas a coating 19 of silver and aluminum may be preferred for use with visible light.

Figure 6:
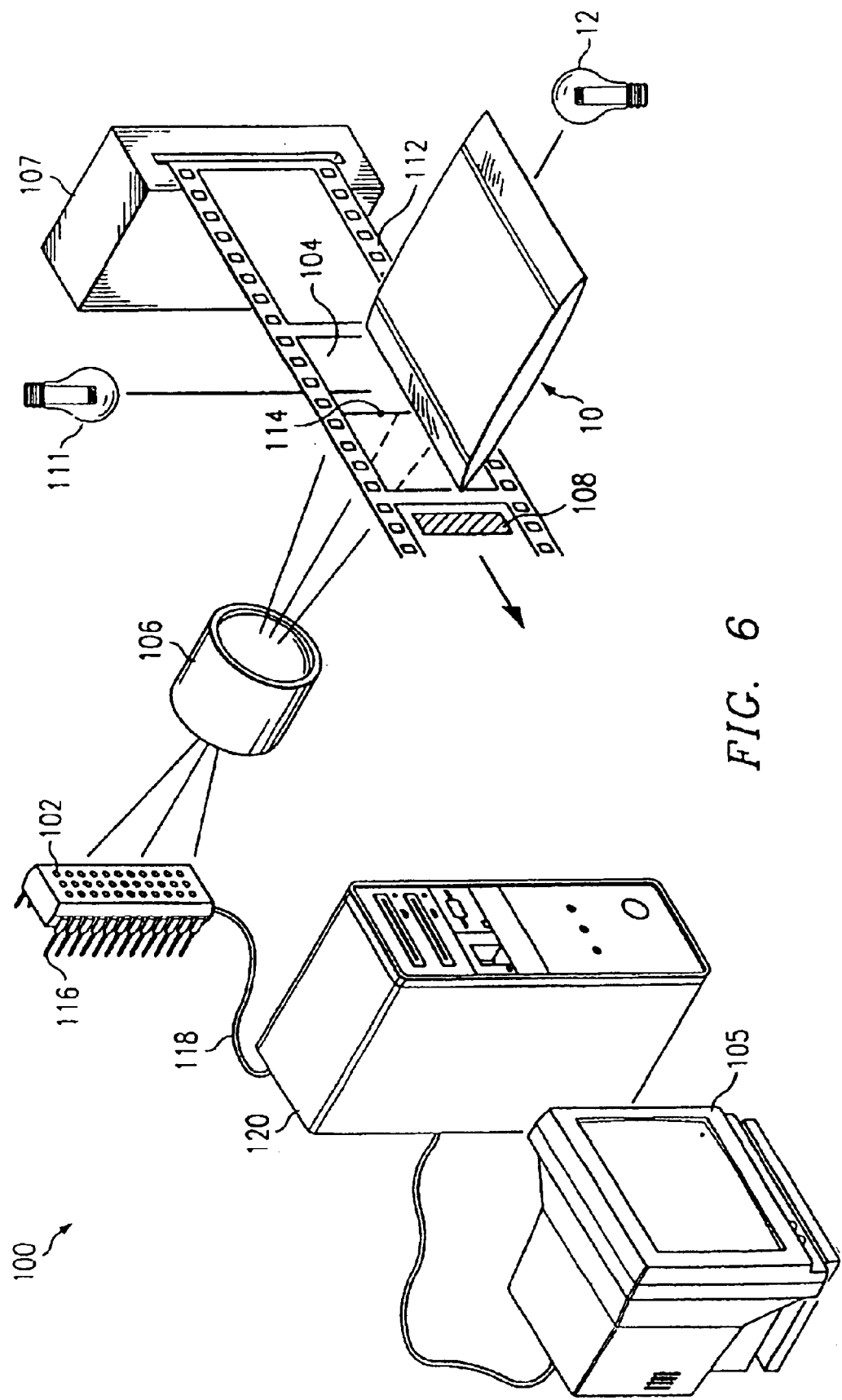
FIG. 6 is a perspective view of a digital film processing system in accordance with the present invention.

Turning now to FIG. 6, a digital film processing system 100 operates by converting electromagnetic radiation from an image to an electronic (digital) representation of the image. The image being scanned is typically embodied in a physical form or an image plane (e.g.,14), such as on a photographic media or film 112, although other media may be used. The electromagnetic radiation used to convert the image into a digitized representation is preferably infrared light.

The digital film processing system 100 generally includes at least one and preferably a number of optic sensors 102. The optic sensors 102 detect light and measure the intensity of electromagnetic energy passing through or reflected by the film 112.

The source of electromagnetic energy is typically a light source 12, which illuminates the film 112 containing the scene image 104. Radiation from the light source 12 may be diffused or directed by additional optics such as filters (not shown) and one or more lens 106. Waveguide device 10 is positioned between the light source 12 and the film 112 to direct light to the film 112, and in order to illuminate the images 104 and 108 more uniformly.

Furthermore, more than one light source may be used with the digital film processing system 100. Light source 12 is positioned on the side of the film 112 opposite the optic sensors 102. This placement results in sensors 102 detecting radiation emitted from light source 12 as it passes through the images 104 and 108 on the film 112. Another light source 111 is shown placed on the same side of the film 112 as the sensors 102. When light source 111 is activated, sensors 102 detect radiation reflected by the images 104 and 108.

The disclosure of U.S. Pat. No. 5,465,155 is hereby incorporated herein by reference as if fully rewritten.

Having shown and described the preferred embodiments of the present invention in detail, it will be apparent that modifications and variations by one of ordinary skill in the art are possible without departing from the scope of the present invention defined in the appended claims. Several potential modifications have been mentioned and others will be apparent to those skilled in the art. Accordingly, the scope of the present invention should be considered in terms of the following claims and is understood not to be limited to the details of structure and operation shown and described in the specification and drawings.

What is claimed is:

1. A waveguide device, comprising:
   a light transmitting body having a first surface extending from a light source end to an image plane end, a second surface extending from the light source end to the image plane end, wherein the second surface substantially opposes the first surface, and a longitudinal axis defined between the light source end and the image plane end, wherein at least one of the first and second surfaces is extended in a direction non-parallel to the longitudinal axis.

2. The waveguide device of claim 1, wherein both the first and second surfaces are extended in directions non-parallel to the longitudinal axis.

3. The waveguide device of claim 1, wherein the first and second surfaces of the light transmitting body are configured in an elliptical shape along the longitudinal axis.

4. The waveguide device of claim 1, wherein the light transmitting body further comprises a proximal portion and a distal portion, wherein the proximal portion is symmetrical with the distal portion.

5. The waveguide device of claim 1, wherein the light transmitting body comprises a dielectric material.

6. The waveguide device of claim 1, wherein the light transmitting body is substantially fabricated from a plastic material.

7. The waveguide device of claim 6, wherein the plastic material comprises acrylic.

8. The waveguide device of claim 1, wherein the light transmitting body comprises a glass material.

9. The waveguide device of claim 1, wherein the light transmitting body is a homogenous material.

10. The waveguide device of claim 1, wherein the waveguide device further comprises a chamber within the light transmitting body.

11. The waveguide device of claim 10, wherein a coating material is formed outwardly on at least one of the first and second surfaces.

12. The waveguide device of claim 11, wherein both the first and second surfaces comprises a coating material.

13. The waveguide device of claim 11, wherein the coating material is selected from group consisting of gold, aluminum, silver, and mixtures thereof.

14. The waveguide of claim 1, wherein the light transmitting body comprises a transverse axis and an end surface, wherein the end surface is configured to be parallel to the transverse axis and proximal to the image plane end.

15. An optical transfer system, comprising:
   (a) a light source operable to produce electromagnetic energy; and
   (b) an elliptically configured waveguide device comprising a light transmitting body having first and second surfaces substantially extending between a first end and a second end, wherein the waveguide device is operable to receive the electromagnetic energy from the light source.

16. The optical transfer system of claim 15, wherein the first end is substantially positioned adjacent the light source.

17. The optical transfer system of claim 15, wherein the light transmitting body further comprises a longitudinal axis, wherein at least one of the first and second surfaces is configured to extend in a direction non-parallel to the longitudinal axis.

18. The optical transfer system of claim 15, further comprising an image plane configured to receive electromagnetic energy from the light source, wherein the second end is substantially positioned adjacent the image plane.

19. The waveguide device of claim 10, wherein a coating material is formed inwardly on at least one of the first and second surfaces.

20. A waveguide device comprising a light transmitting body having a first surface, a second surface, and a longitudinal axis, wherein at least one of the first and second surfaces is configured to be oriented non-parallel to the longitudinal axis and at least one of the first and second surfaces comprises a coating material.

* * * * *